Nov. 14, 1933.  G. M. BELLANCA  1,934,678
AIRPLANE MOTOR MOUNTING
Filed July 2, 1931
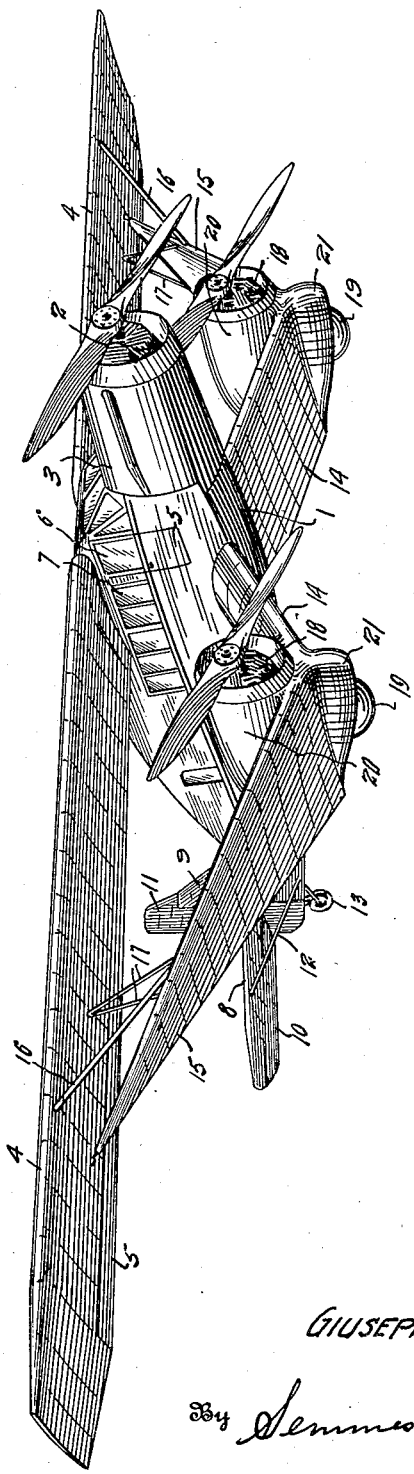
Inventor
GIUSEPPE M. BELLANCA
By Semmes & Semmes
Attorneys Patented Nov. 14, 1933

1,934,678

UNITED STATES PATENT OFFICE 1,934,678

AIRPLANE MOTOR MOUNTING

Giuseppe M. Bellanca, New Castle, Del.

Application July 2, 1931. Serial No. 548,439

3 Claims. (Cl. 244—14)

This invention relates in general to aircraft and more particularly has reference to a multi-engine airplane.

Previous to this time, airplanes having two or more motors, have had the same mounted on each side of the fuselage, suspended from a top wing, or mounted between wings, or on a lower wing. These forms of motor mountings have been generally disadvantageous for the reasons that the superstructure included in such mountings in conjunction with the landing gear assembly has added very considerably to the resistance of an airplane, and the motors have generally been mounted above the longitudinal line of balance of an airplane, affecting its stability.

I propose to eliminate these disadvantages, inherent in the construction of multi-motor airplanes by adapting the single motor airplane, shown in my copending application Serial No. 459,746 to a multi-motor airplane.

It is an object of this invention, therefore, to provide a motor mounting on each side of the fuselage of an airplane which will add a minimum of resistance to the airplane.

Another object of this invention is to provide lift surfaces for supporting a motor on each side of an airplane fuselage.

Still another object of this invention is to provide lift surfaces on each side of an airplane fuselage for supporting a motor and a landing wheel.

A further object of this invention is to provide a motor mounting faired in supplemental lift surfaces on each side of an airplane fuselage.

A still further object of this invention is to provide a motor and landing wheel mounting faired in supplemental lift surfaces on each side of an airplane fuselage.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown, in the accompanying drawing, means for carrying the same into practical effect without limiting the improvements in their useful applications to the particular constructions which, for the purpose of explanation, have been made the subject of illustration.

In the single figure in the drawing forming a part of this specification, there is shown a perspective view of an airplane of the character described in my aforementioned copending application showing faired motors and landing wheels supported on each side of the fuselage on lift surfaces.

Referring more particularly by numerals to the drawing, there is shown an airplane comprising a fuselage 1 having a motor 2, mounted in the nose thereof, enclosed by a cowling 3. A top main wing 4 is mounted across the forward part of the fuselage in the usual manner, provided with ailerons 5 adjacent the outer extremities of the trailing edge thereof.

The top front portion of the fuselage is provided with a door 6 and front and side windows 7 to a cabin and cock pit, and the rear with a conventional tail assembly comprising the usual horizontal and vertical stabilizing fins 8 and 9, elevator 10 and balanced rudder 11. The mounting of the horizontal stabilizing fin 8 is reinforced by braces 12. A landing wheel 13 is mounted on the bottom of the fuselage at its rear extremity.

The airplane is provided with additional lift surfaces on each side of the fuselage comprising stub wings 14, and left struts 15. The stub wings are mounted on the sides of the fuselage at the lower edges, below the main wing, at an angle with respect to the main wing. The lift struts are triangular in form and connected between the outer extremities of the stub wings and the under-side of the main wing.

The base of each lift strut is connected to the ends of the stub wings and the apexes to the underside of the main wing. The mounting of the lift struts on the main wing is reinforced by spars 16 and braces 17. As fully described in my copending application, this form of mounting provides for a minimum of resistance at the mounting between the lift struts and the main wing.

In accordance with my invention, I mount motors 18 on the stub wings and lift struts at the point of connection, and landing wheels 19, thereunder.

The motor mountings may be incorporated in the extremities of the stub wings or between the stub wings and the lift struts. The motors are faired between the stub wings and lift struts in cowlings 20, so as to offer a minimum of resistance. The upper portions of the landing wheels, mounted either on the ends of the stub wings, or between the stub wings and lift struts, are enclosed in fairings 21, continuous with the undersurfaces of the stub wings and lift struts.

It will be appreciated from the foregoing description, and seen with reference to the drawing, that I provide for fairing motors in lift surfaces on each side of an airplane fuselage and thus eliminate, all except the resistance of the motor fairings, dispensing with exposed mounting superstructure. The landing gear is similarly faired under the lift surfaces, and both the motors and landing wheels thus mounted on each side of the fuselage below the longitudinal line of balance of the airplane suspended between the main wing and the fuselage, without support other than by lift surfaces adding to the efficiency of the airplane. The mounting of a third motor in the nose of the fuselage is, of course, optional.

There is accomplished by this invention a motor and landing wheel mounting on lift surfaces on each side of an airplane fuselage, below the longitudinal line of balance thereof, without resistance other than that offered by fairings for the motors and wheels.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An airplane comprising a fuselage, upper main wings, lower stub wings of negative dihedral, triangular angularly arranged lift struts connecting the ends of the stub wings to the undersides of the main wings, a support extending from each of said lift struts near the termination thereof to the leading edge of the main wings to reinforce said lift struts, and power plants superimposed on landing members enclosed in fairings and mounted at the point of connection between the stub wings and lift struts.

2. An airplane comprising a fuselage, upper main wings, lower stub wings of decided negative dihedral, triangular angularly arranged lift struts attached along a base of the triangle to the stub wing connecting the ends of the stub wings to the undersides of the main wings, a support and a triangular brace extending from each of the lift struts near the termination thereof to reinforce the same, said support being connected to the leading edge of the main wings, and power plants superimposed on landing members enclosed in fairings, the power plants and landing, each being mounted at the point of connection between the stub wings and lift struts.

3. An airplane comprising a fuselage, upper main wings attached to the fuselage, lower stub wings of negative dihedral extending from the fuselage, lift struts connecting the ends of the stub wings to the underside of the main wings; landing gear attached at the joint between the stub wings and lift struts, and power plants mounted at the point of connection between the stub wings and the struts.

GIUSEPPE M. BELLANCA.